Patented Feb. 13, 1940

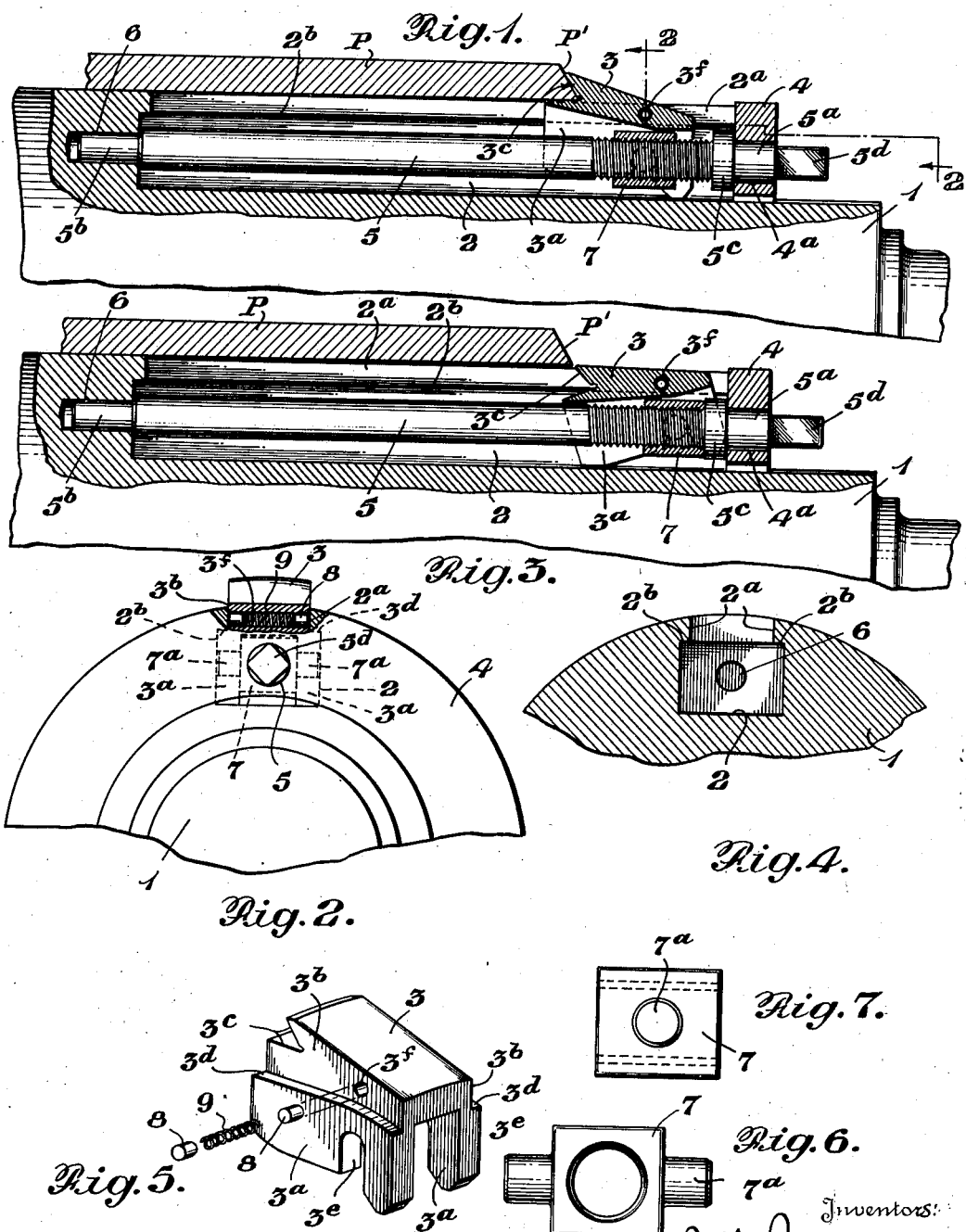

2,190,385

UNITED STATES PATENT OFFICE 2,190,385

PLATE CLAMP FOR ROTARY PRINTING PRESSES

William P. V. Ross and Donald H. Mars, Battle Creek, Mich., assignors to Duplex Printing Press Company, Battle Creek, Mich., a corporation of Michigan Application February 4, 1939, Serial No. 254,737

21 Claims. (Cl. 101—378)

This invention relates to rotary cylinder printing presses, and more particularly to novel improvements in the clamps for securing the printing plates onto the plate holding cylinders, which plates are ordinarily formed with an internal curvature conforming with the external curvature of the cylinder, the ends of the plates being beveled and engaged by the clamps which are mounted on the cylinder, the clamps having their plate contacting portions undercut so as to overlap the beveled ends of the plates, thereby fixedly holding the plates on the cylinders against radial or axial movements.

It is very desirable and advantageous to mount the plate clamps at the ends of the cylinder so that same may be retracted below the surface of the cylinder to facilitate placing the plates thereon; and in presses using tubular plates, i. e., plates which extend more than half way around the cylinder, such mounting is a necessity since in order to slip the plate onto the cylinder from the end there can be no obstruction extending beyond the surface of the cylinder, which surface as above stated conforms with the internal curvature of the plate.

The principal object of our invention is to provide a simple, novel, and efficient plate clamp having actuating means which will impart a combined rocking motion and rectilinear motion to the clamp, whereby the clamp may be retracted to or slightly below the surface of the cylinder to permit a plate to be slipped over the end of the cylinder without obstruction, and whereby the clamp may be projected so as to extend above the surface of the cylinder to engage the beveled end of the plate adjusted on the cylinder into proper printing position.

We will explain the invention with reference to the accompanying drawing which illustrates one practical embodiment thereof to enable others familiar with the art to adopt and use the same; and will summarize in the claims, the novel features of construction, and novel combinations of parts, for which protection is desired.

In said drawing:

Fig. 1 is a partial longitudinal section through the lock-up end of a plate cylinder, showing one of our novel clamps projected into plate holding position.

Fig. 2 is a section on the line 2—2, Fig. 1.

Fig. 3 is a section similar to Fig. 1 but showing the clamp in retracted position, substantially flush with the surface of the cylinder.

Fig. 4 is a transverse section through the groove of the cylinder in which the clamp operates.

Fig. 5 is a perspective view of the clamp detached, showing in exploded arrangement the shoes and spring of the friction means.

Fig. 6 is a front view of the crosshead which actuates the clamp.

Fig. 7 is a side view of the crosshead.

As shown in Figs. 1–4, the body of the plate cylinder 1 is provided with recesses, one of which is shown at 2, said recess being disposed adjacent one end of the cylinder to house a plate clamp 3. While we have illustrated only one clamp 3 on the cylinder 1 there may be any number of such clamps arranged around the cylinder. Groove 2 is preferably of rectangular cross-section, and at the outer edges of the side walls thereof are opposed flanges 2a forming shoulders 2b for the purpose hereinafter set forth. The printing plate P is slidably mounted on the cylinder 1, overlapping a portion of groove 2, and has its edge beveled as at P' in the usual manner.

Mounted on the cylinder 1 is a ring 4 closing the outer end of recess 2, said ring having a bore 4a forming a bearing for one end 5a of a screw 5 disposed axially of the groove 2, the inner end 5b of the screw being journaled in a bore 6 in the inner end of said recess. The screw 5 is free to rotate in the recess but is held against axial movement by a shoulder 5c thereon engaging the inner face of ring 4. The outer end of screw 5 projects beyond the ring 4 and is squared as at 5d or otherwise formed to permit the screw to be rotated by any desired means.

Clamp 3 is preferably of inverted U-shape, and of less length than the distance from the plate P to the ring 4, and the legs 3a thereof are spaced apart a distance greater than the diameter of screw 5, and the outer faces of the legs 3a slidably engage the side walls of recess 2 as shown in Fig. 2. The outer upper sides of the clamp 3 are recessed as at 3b (Fig. 5) to conform with the spacing of the opposed faces of the flanges 2a of recess 2 so that the upper portion of clamp 3 may be partly projected out of the recess 2 as shown in Fig. 1, in order that the notched inner end 3c of the clamp may embrace the beveled end P' of the plate P and bottom face of the plate adjacent the bevel P', the notch 3c conforming with the angularity thereof. The clamp 3 may be retracted entirely within the recess 2, as shown in Fig. 3 or may be projected into plate clamping position, as in Fig. 1, and the depth of the recessed portions 3b of clamp 3 is such that when the clamp 3 is thus projected the shoulders 3d at the lower ends of the portions 3b squarely contact the shoulders 2b at the undersides of the flanges 2a of recess 2 to limit the projecting movement of the clamp. When the clamp 3 is projected, the top surface of the notch 3c overlaps the beveled end P' of the plate P and the under surface of said notch is flush with the outer surface of cylinder 1 and forms a support for the under surface of the end of the plate P. Thus the projected clamp 3 fills the gap under the end of the plate formed by the recess 2 in the cylinder.

Threaded on screw 5, within recess 2, is a crosshead 7 (Figs. 6–7) of such width that it will make a sliding fit between the legs 3a of clamp 3, and said crosshead is provided at its ends with opposed gudgeons 7a adapted to enter opposed notches 3e (Fig. 5) in the legs 3a of the clamp, the notches 3e being of slightly greater width than the diameter of the gudgeons, and the notches holding the crosshead against rotation with the screw 5. However, any other desired means to actuate the crosshead 7 axially of the recess 2 may be used instead of the screws 5.

The clamp 3 is provided with a bore 3f disposed parallel with and above the axis of the notches 3e. In the ends of said bore are placed shoes 8, with a spring 9 interposed between them and yieldably urging the shoes 8 outwardly into frictional contact against the opposed surfaces of the flanges 2a of recess 2 as shown in Fig. 2.

In retracting clamp 3 from its plate holding position, shown in Fig. 1, the screw 5 is rotated to move crosshead 7 away from the plate P. The gudgeons 7a of the crosshead engage the clamp through notches 3e and the frictional contact of shoes 8 against flanges 2a of the recess forms a couple acting to rock the clamp around the movable fulcrum consisting of the yieldably pressed shoes 8 as the crosshead and clamp slide in recess 2, and thus the clamp 3 moves axially in the recess and is simultaneously rocked. When the clamp has been rocked to bring its upper surface at or slightly below the cylinder surface as shown in Fig. 3, its plate contacting notch 3c has been moved outwardly sufficiently to clear the end P' of the plate which can then be removed over the retracted clamp and withdrawn from the cylinder 1.

When a plate P is manually placed on cylinder 1 into proper printing position, the above action is reversed to lock the plate thereon. When the screw 5 is rotated the clamp is shifted by crosshead 7 towards the plate P, and simultaneously the frictional contact of shoes 8 against the sides 2a of the recess will form a couple which will cause the notched end 3c of the clamp 3 to rise above the surface of the cylinder 1. When the clamp 3 has reached the end of plate P further movement of the crosshead 7 merely shifts clamp 3 inwardly of the recess, the friction shoes 8 merely sliding against the surfaces 2a of the recess, the clamp 3 being held against further rocking movement by the shoulders 2b on the recess contacting the shoulders 3d on the clamp.

We claim:

1. In combination with a plate cylinder having a recess, a clamp having a plate engaging portion, said clamp being normally housed within the recess and slidably mounted therein; means engaging the clamp for moving same axially of the recess; and means whereby as the clamp is moved in one direction the clamp will be rocked in a plane parallel with the axis of the cylinder to partly project same out of the recess, and when the clamp is moved in the other direction the clamp will be retracted within the recess.

2. In a combination as set forth in claim 1, means for limiting the projecting movement of the clamp.

3. In combination with a plate cylinder having a recess; a clamp having a plate engaging portion, said clamp being normally housed within the recess and slidably mounted therein; means engaging said clamp for moving same axially of the recess; and means for projecting the plate engaging portion out of and into the recess according to the direction of movement of the clamp, comprising opposed shoes slidably and yieldably engaging the sides of the recess and forming a couple with the moving means.

4. In a combination as set forth in claim 3, means for limiting the projecting movement of the clamp.

5. In combination with a plate cylinder having a recess, a clamp having a plate engaging portion, said clamp being normally housed within the recess and slidably mounted therein; means engaging the clamp for moving same axially of the recess; and friction means on the clamp engaging the sides of the recess above the moving means and forming a moving fulcrum, whereby as the clamp is moved in one direction the said means will rock the clamp to partly project same out of the recess, and when the clamp is moved in the other direction the said means will retract the clamp within the recess.

6. In a combination as set forth in claim 5, means for limiting the projecting action of the said rocking means.

7. In a combination as set forth in claim 5, said friction means comprising opposed shoes slidably and yieldably engaging the sides of the recess and forming a couple with the moving means tending to upend the clamp.

8. In combination with a plate cylinder having a recess, a rotatable screw extending into said recess, a crosshead threaded on said screw; a plate clamp having a plate engaging portion, said clamp being normally housed within the recess and slidably mounted therein; said crosshead being pivotally connected with said clamp; and means whereby as the screw is rotated in one direction the clamp will be rocked to partly project same out of the recess, and when the screw is rotated in the other direction the clamp will be retracted within the recess.

9. In a combination as set forth in claim 8, means for limiting the projecting movement of the clamp.

10. In a combination as set forth in claim 8, said recess having parallel side walls, and said clamp being of substantially inverted U-shape, and having opposed notches in its legs receiving the ends of the crosshead.

11. In a combination as set forth in claim 8, said rocking means comprising opposed shoes slidably and yieldably engaging the sides of the recess and forming a couple with the moving means tending to upend the clamp.

12. In a combination as set forth in claim 8, said clamp having a bore above and parallel with the crosshead; said rocking means comprising shoes slidably mounted in the ends of the bore and engaging the sides of the recess, and yieldable within the bore tending to separate the shoes.

13. In combination with a plate cylinder having a recess, a rotatable screw extending into said recess, a crosshead threaded on said screw; a plate clamp having a plate engaging portion, said clamp being normally housed within the recess and slidably mounted therein; said crosshead having its ends engaging said clamp intermediate its ends; and friction means on the clamp engaging the sides of the recess above the crosshead and forming a fulcrum movable with the clamp, whereby as the screw is rotated in one direction the friction means will rock the clamp to partly project same out of the recess, and when the screw is rotated in the other direction the friction means will retract the clamp within the recess.

14. In a combination as set forth in claim 13, interengaging surfaces on the walls of said recess and said clamp adapted to limit the projecting action of the friction means.

15. In a combination as set forth in claim 13, said recess having parallel side walls, and said clamp being of substantially inverted U-shape, and having opposed notches in its legs receiving the ends of the crosshead.

16. In a combination as set forth in claim 13, said friction means comprising opposed shoes slidably and yieldably engaging the sides of the recess and forming a couple with the moving means tending to upend the clamp.

17. In combination with a plate cylinder having a recess having parallel side walls and opposed flanges at the outer edges of said walls, a rotatable screw extending into said recess, a crosshead threaded on said screw; a plate clamp having a plate engaging portion, said clamp being normally housed within the recess and slidably mounted therein; said crosshead having its ends engaging said clamp intermediate its ends; and friction means on the clamp engaging the opposed faces of the flanges above the crosshead and forming a fulcrum movable with the clamp, whereby as the screw is rotated in one direction the friction means will rock the clamp to partly project same out of the recess, and when the screw is rotated in the other direction the friction means will retract the clamp within the recess.

18. In a combination as set forth in claim 17, said clamp having a bore above and parallel with the crosshead; and said friction means comprising shoes slidably mounted in the ends of the bore and engaging the flanges, and a coiled spring within the bore between the shoes yieldably separating the shoes.

19. In a combination as set forth in claim 17, said clamp having side walls engaging those of the recess, and having inclined surfaces at the upper ends of the side walls adapted to engage the undersides of the flanges when the clamp is in projected position to limit the projecting movement of the clamp.

20. In a combination as set forth in claim 17, said clamp having side walls engaging those of the recess, and having inclined surfaces at the upper ends of the side walls adapted to engage the undersides of the flanges when the clamp is in projected position; said clamp having a bore above and parallel with the axis of the crosshead; and said friction means comprising shoes slidably mounted in the ends of the bore and engaging the opposed faces of the flanges; and yieldable means within the bore tending to separate the shoes.

21. In a combination as set forth in claim 17, said clamp being of substantially inverted U-shape, and having opposed notches in its legs receiving the ends of the crosshead.

WILLIAM P. V. ROSS.
DONALD H. MARS.